United States Patent [19]

Richardson

[11] 4,107,874
[45] Aug. 22, 1978

[54] SPROUTER

[76] Inventor: David A. Richardson, 2506 Southland Dr., Austin, Tex. 78704

[21] Appl. No.: 763,596

[22] Filed: Jan. 28, 1977

[51] Int. Cl.² .............................................. A01C 1/02
[52] U.S. Cl. ........................................... 47/14; 47/61
[58] Field of Search .................. 47/14, 15, 16, 59, 60, 47/61, 62, 63, 64, 73, 77, 86, 87; 217/13, 14, 57

[56]  References Cited
U.S. PATENT DOCUMENTS

| 129,972 | 7/1872 | Ludlum | 47/73 |
|---|---|---|---|
| 584,433 | 6/1897 | Walker | 47/73 |
| 1,758,128 | 5/1930 | Rosevear | 47/73 |
| 2,179,642 | 11/1939 | Lund | 47/61 |
| 2,722,778 | 11/1955 | Carufel | 47/14 |
| 3,164,281 | 1/1965 | Williams | 217/14 |
| 3,965,614 | 6/1976 | Kienholz | 47/17 |
| 4,006,557 | 2/1977 | Sawyer | 47/14 |

FOREIGN PATENT DOCUMENTS

| 31,273 | 9/1884 | Fed. Rep. of Germany | 47/14 |
|---|---|---|---|
| 20,825 of | 1892 | United Kingdom | 47/16 |
| 483,733 | 4/1938 | United Kingdom | 47/14 |
| 881,149 | 11/1961 | United Kingdom | 47/73 |

Primary Examiner—Edgar S. Burr
Assistant Examiner—James R. Feyrer
Attorney, Agent, or Firm—Clarence A. O'Brien; Harvey B. Jacobson

[57] ABSTRACT

A sprouter having a wall or walls defining the lateral extent of a growing chamber, and a base connected to the wall or walls for forming a bottom of the chamber. The base includes proturbances that form indentations on the base for retaining a quantity of water which supplies sprouts growing in the growing chamber with water for a predetermined length of time. The proturbances also prevent seeds in the growing chamber from sliding when the base is tilted slightly during movement.

6 Claims, 7 Drawing Figures

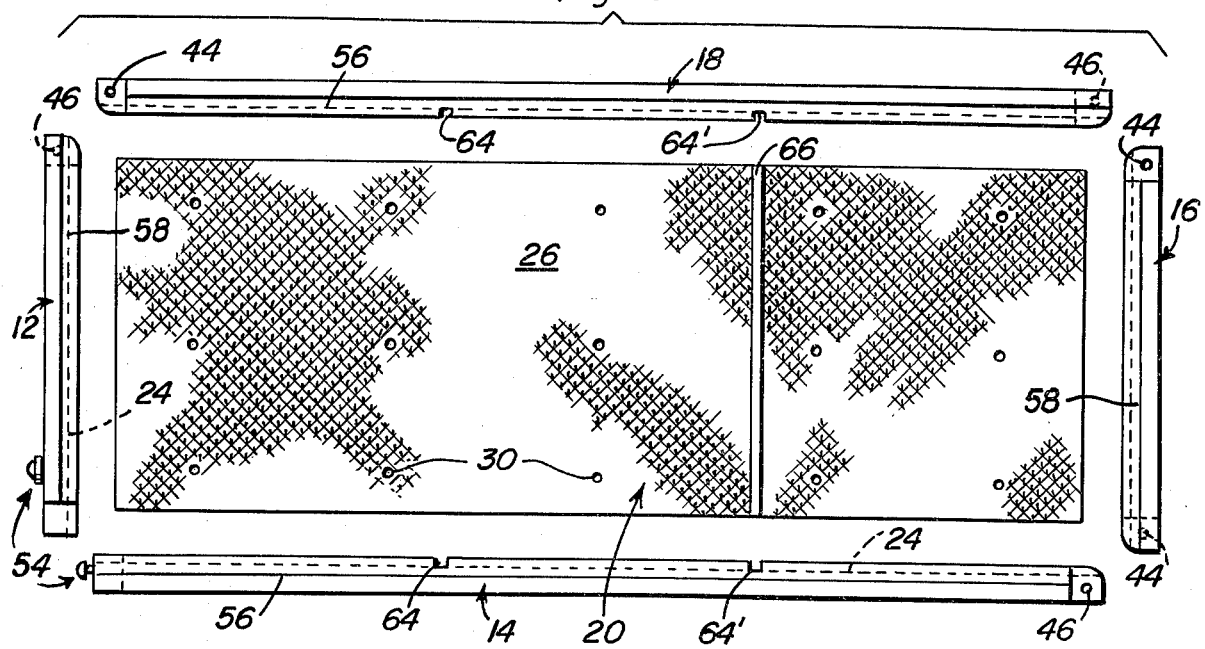
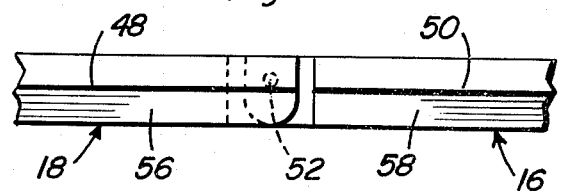
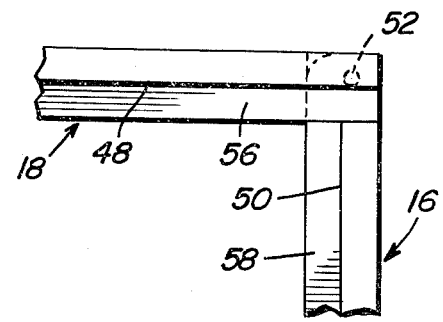
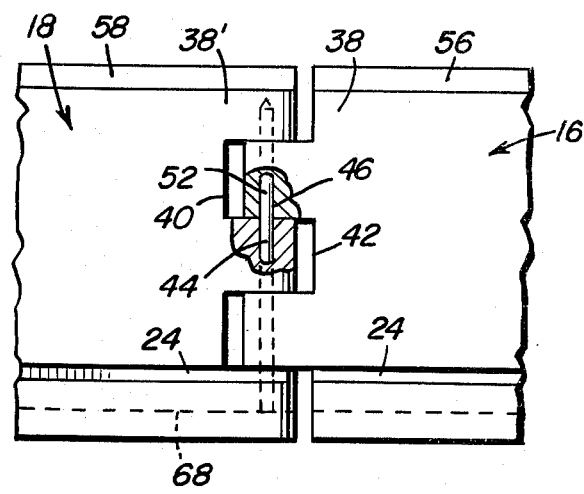
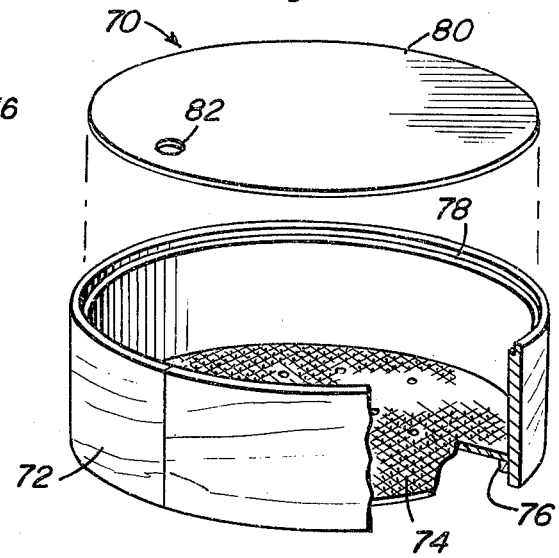

SPROUTER

BACKGROUND OF THE INVENTION

1. Field of the Invention

This invention relates generally to a sprouter, and particularly to a sprouter having a side wall or walls constructed from a suitable wood, such as redwood, and having a base which retains a predetermined quantity of water for supplying the needs of sprouts in the growing chamber for a predetermined length of time.

2. Description of the Prior Art

Sprouters have been proposed for satisfying the needs of the modern suburban family for obtaining a sprout crop in the kitchen or other suitable area of the home. U.S. Pat. No. 3,141,263, issued July 21, 1964, to G. Wang, discloses a sprouter for growing edible beans and like crops in which a sponge bottom surface is provided for the crops, and a suitable cover is provided for permitting the crops to be immersed in darkness. As brought out in column 2, lines 14 through 19, of U.S. Pat. No. 3,141,263, leguminous sprouts for eating and similar purposes are ideally grown in the dark so as to obtain the optimum quality of texture and succulence of the sprouts, together with an uninterrupted uniformity in the growth of the sprout, while inhibiting their tendency toward manufacturing chlorophyll.

Another example of a sprouter known in the prior art can be found in U.S. Pat. No. 1,209,938, issued Dec. 26, 1916, to W. H. Collins. Further, U.S. Pat. Nos.: 979,175, issued Dec. 20, 1910, to H. L. Lapham; U.S. Pat. Nos. 1,057,877, issued Apr. 1, 1913, to J. M. Peeples; and 1,094,813, issued Apr. 28, 1914, to M. P. Reynolds, disclose trays intended for the purpose of testing seeds, while U.S. Pat. Nos.: 606,140, issued June 21, 1898, to J. A. Haskett; 2,494,275, issued Jan. 10, 1950, to H. A. Abbott; and 3,164,281, issued Jan. 5, 1965, to A. R. Williams, Jr., disclose collapsible crates and light containers which have features that could be used with sprouters and like containers.

A difficulty encountered with sprouters in general is that the sprouts tend to grow through any hole, crack, or crevice available in the structure forming the growing chamber of the sprouter. When cloth, wire, plastic, or molded screens are used as the base of the sprouter, cleaning of the mesh is difficult, and the tighter the mesh the more difficult it is to remove all traces of old roots. With larger mesh, there is a tendency to rinse away the seeds themselves. Cloth and similar absorbent materials are by far the most difficult to keep clean, and are extremely prone to mildew and odor. In most climates, great user resistance to sprouting occurs when the sprout crops develop recurrent putrefaction, mold and fungus. The sprouting medium or material used as the base or bottom of the sprouter has a direct bearing on the incidents of these problems.

Another difficulty encountered with the use of sprouters is that they must be frequently opened up and watered. Sometimes the sprouts must be watered several times a day.

SUMMARY OF THE INVENTION

It is an object of the present invention to provide a sprouter which will eliminate mildew, mold, fungus, and odor.

It is another object of the present invention to provide a sprouter which will decrease the frequency of watering of the sprouts.

It is yet another object of the present invention to provide a sprouter which is constructed in a manner as to facilitate cleaning of the sprouter.

These and other objects are achieved according to the present invention by providing a sprouter having: a wall defining the lateral extent of a growing chamber of the sprouter; and a base connected to the wall for forming a bottom of the growing chamber, with the base including a plurality of indentations arranged for retaining a quantity of water and supplying sprouts disposed in the growing chamber with water for a predetermined length of time. Preferably, the base is a substantially planar sheet having a pair of parallel faces, with one of the faces forming a surface common to a plurality of proturbances which extend codirectionally from such common surface so as to form the aforementioned water-retaining indentations. At least one aperture is provided in the sheet for draining excess water from the growing chamber, such aperture being of a size so as to resist clogging by seed hulls and plant roots normally found in the growing chamber, with the indentations also acting to prevent the seeds from sliding relative to the base of the sprouter at such times as the sprouter may be tilted slightly during movement of the sprouter between a kitchen sink and the normal location of the device.

According to a preferred embodiment of the invention, there are a plurality of substantially planar walls pivotally connected together so as to extend around the periphery of the base of the sprouter. Each of these walls has an upper edge and a lower edge defining a finite thickness of the wall, and also includes a pair of spaced ends extending substantially perpendicularly to the edges. The ends of each of the walls are notched in alternate sequence to one another for interengaging with an end of an adjacent one of the walls, with at least some of the walls being provided with holes extending perpendicular to the edges of the walls and at the notched ends of the walls so as to receive pins which cooperate with the notches and projections thus formed to form an interleaving hinge. By offsetting the holes provided in the notched ends of the walls from a center line through the thickness of the walls, the pins will be eccentrically positioned with respect to the resulting hinged joint for spacing the ends of the walls from one another when an included angle between the joining walls is increased toward 180 degrees in order to facilitate cleaning of the ends of the walls without removing the ends from their associated holes. At least one pair of notched ends of adjoining walls is connected together by a suitable latch assembly so as to be easily released in order to spread apart the walls during cleaning operations, and the like.

A cover panel is removably supported on ledges provided adjacent the upper edges of the walls in order to place the growing chamber of the sprouter in substantial darkness.

If desired, there can be only a single wall arranged around the periphery of the base according to the invention, with an appropriate cover arranged over the single continuous wall.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an exploded, top plan view showing the sprouter of FIGS. 1 and 2, but with the cover not shown.

FIG. 4 is an enlarged, fragmentary, top plan view showing a detail of a hinged joint between a pair of adjacent walls of the sprouter of FIGS. 1 through 3, with the adjacent walls being arranged substantially planar to show the resulting gap between the notched ends of the walls.

FIG. 5 is a fragmentary, top plan view, similar to FIG. 4, but showing the walls substantially perpendicular to one another.

FIG. 6 is a fragmentary, side elevational view, partly cut away and a section, showing the arrangement of pivotally joined walls as arranged in FIG. 4.

FIG. 7 is an exploded, perspective view, partly cut away and in section, showing a second embodiment of a sprouter according to the present invention.

DESCRIPTION OF THE PREFERRED EMBODIMENTS

Figure 1:
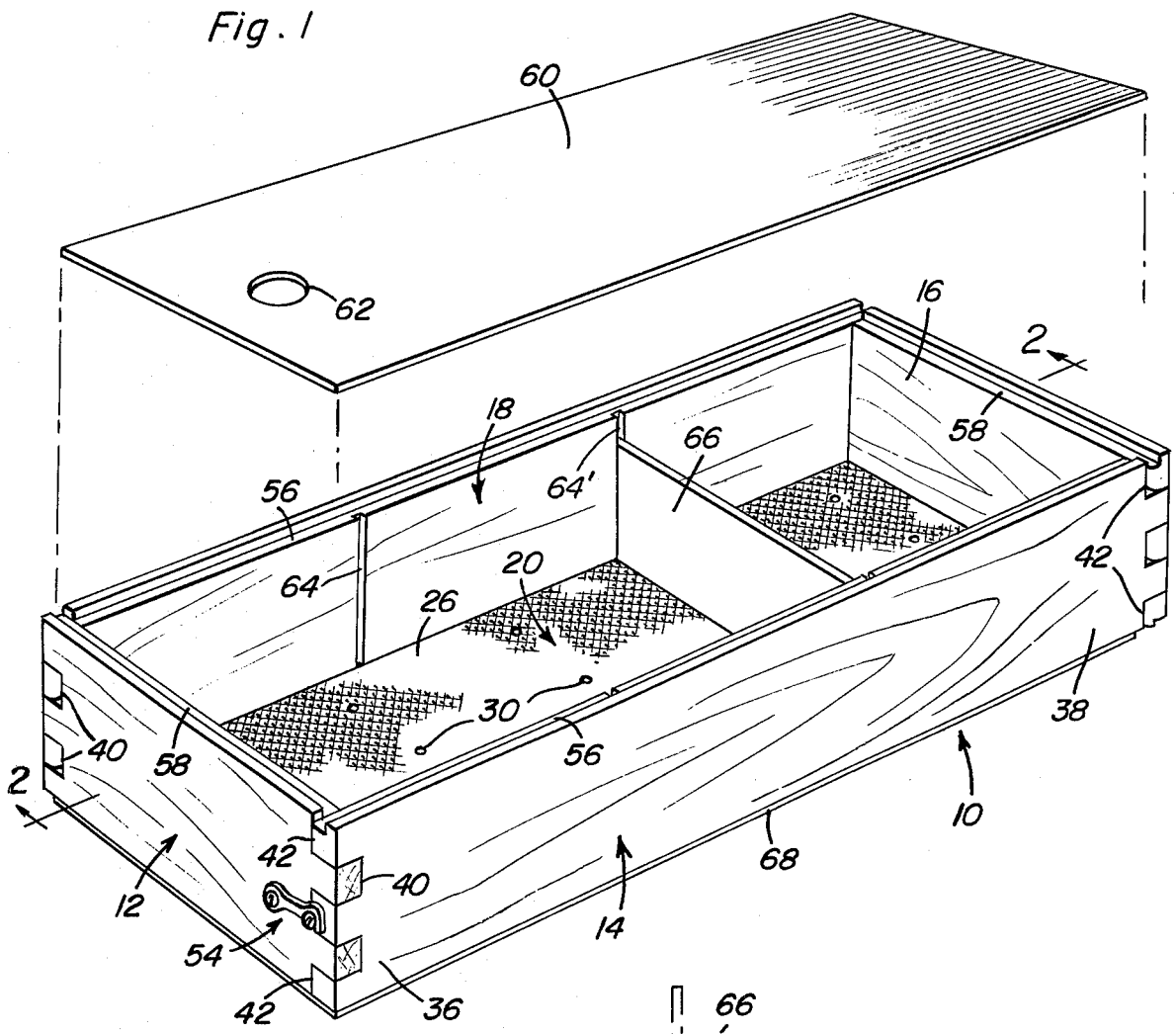
FIG. 1 is an exploded, perspective view showing a first embodiment of a sprouter according to the present invention.
Figure 2:
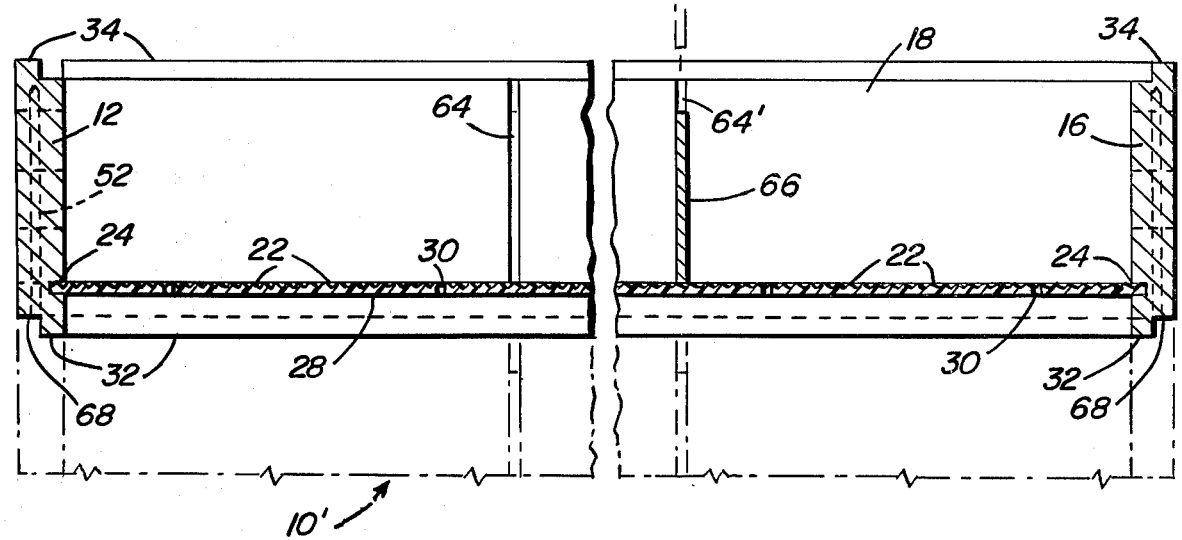
FIG. 2 is an enlarged, fragmentary, sectional view taken generally along the line 2—2 of FIG. 1, but with the cover not shown.

Referring now more particularly to FIGS. 1 through 6 of the drawings, a sprouter 10 according to the present invention is shown as including four walls 12, 14, 16, and 18 connected to one another in an articulated fashion so as to define the lateral extent of a growing chamber of sprouter 10. A base 20 is supported by walls 12, 14, 16, and 18 for forming a bottom of the aforementioned growing chamber, with base 20 including a plurality of proturbances 22 which form associated indentations retaining a quantity of water which supplies sprouts (not shown) disposed in the growing chamber for a predetermined length of time. Such length of time may encompass several days. As perhaps can best be seen from FIG. 2, the walls 12, 14, 16, and 18 cooperate to form a continuous groove 24 which receives base 20 in order to retain base 20 within the lower portion of the walls of sprouter 10.

In addition to retaining a supply of water on base 20, the indentations formed by proturbances 22 also prevent seeds (not shown) from sliding relative to base 20 when base 20 may be tilted for whatever reason.

Base 20 is a substantially planar sheet of a suitable synthetic material, and the like, having a pair of parallel faces 26 and 28 with face 26 forming a surface common to the codirectionally extending proturbances 22, and has at least one, and preferably a plurality, of apertures 30 provided therein for draining excess water from the growing chamber of sprouter 10. Apertures 30 are selected of a size that resists clogging by seed hulls (not shown) and plant roots (not shown) normally found in the growing chamber.

Each of the walls 12, 14, 16, and 18 is provided with lower and upper edges 32 and 34 defining a finite thickness of the associated wall, and each of the walls 12, 14, 16, and 18 also is provided with two spaced ends 36 and 38 extending substantially perpendicularly to the edges 32 and 34. The ends 36, 38 of each of the walls, 12, 14, 16, and 18 are provided with notches 40, 42 in alternate sequence to one another for interengaging with an end 36, 38 of an adjacent one of the walls 12, 14, 16, and 18. At least some of the walls 12, 14, 16, and 18 are provided with holes 44, 46 extending substantially perpendicular to the edges 32, 34 of the walls and disposed at the notched ends 36, 38 thereof. Each of the holes 44, 46 is offset from a center line which can be equivalent to the lines designated 48 and 50, through the finite thickness of the associated walls in order to place the holes 44, 46 in offset relation with respect to the thickness of the walls. Pins 52 are removably inserted in the aligned holes 44, 46 for pivotally joining the associated walls to one another. The offset of the holes 44, 46 locates the pins 52 eccentrically with respect to the resulting joint for spacing the ends 36, 38 of the walls 12, 14, 16, and 18 from one another when an included angle between the enjoining walls is increased to 180° so as to facilitate the joints at the ends 36, 38 of the walls, 12, 14, 16, and 18 without removing the pins 52 from their associated holes 44, 46.

As will be appreciated, the walls are divided in two pairs 12, 16 and 14, 18 of essentially identical construction so as to form a substantially rectangular growing chamber. One corner joint of the aforementioned walls is not hinged together as by a pin 52, but is releasably joined together as by a conventional latch assembly 54 in order to permit the walls, 12, 14, 16, and 18 to be spread apart — that is, the included angle at the corners to be increased toward 180° — when cleaning the walls and base 20 of sprouter 10. This arrangement also facilitates assembly of sprouter 10 inasmuch as base 20 can be easily inserted into its retaining groove 24 while latch assembly 54 is in a released mode and the walls 12, 14, 16, and 18 are slightly spread apart with respect to the base 20.

Edges 34 are provided with ledges 56, 58 on walls 14, 18 and 12, 16, respectively, which ledges 56, 58 extend into the thickness of the associated walls to the aforementioned lines 48, 50, so as to provide a seat for a cover panel 60 provided with suitable openings 62 for permitting a user (not shown) of sprouter 10 to insert a finger therein and remove cover panel 60 from its seat as desired.

Grooves 64 and 64' are advantageously provided in the opposed pair of walls 14 and 18 so as to extend perpendicularly to the edges 32 and 34 of these walls and support a divider 66 in order to partition the growing chamber into two or more compartments. Further, the lower edge 32 may be rabbeted as shown at 68 for permitting the sprouter 10 to be arranged seated on the upper edge 34, provided with the ledges 56, 58, of a sprouter designated 10' which will be understood to be essentially the same as sprouter 10, so as to permit a plurality of sprouters according to the invention to be stacked on top of one another.

Referring now more particularly to FIG. 7 of the drawings, a sprouter 70 is illustrated which includes only a continuous, cylindrical wall 72 forming the lateral extent of a growing chamber whose bottom is defined by a circular base 74 constructed from a similar material and in a similar manner as base 20. A ring 76 can be employed to retain base 74 in a desired position within the confines of wall 72, while the upper edge of wall 72 is provided with a ledge 78 for receiving a circular cover panel 80 provided with an opening 82 which functions in the same manner as opening 62 of panel 60. It will be appreciated that a sprouter according to the invention may take other configurations than those shown in FIGS. 1 and 7 as well.

The material forming the bases 20, 74, which can be constructed from a suitable polymeric resin, such as an acrylic, may be provided with a varying number of apertures 30. Although only 15 apertures have been shown for base 20, a similar structure has been provided with 32 apertures of 44 gauge each and has been found satisfactory. Further, the proturbances 22 can take various shapes, although a pyramid shape has likewise been found satisfactory.

Because of the dimples or indentations provided on the upwardly facing surface of the base 20, 74, and its tendency to retain water by means of surface tension, water sufficient to supply the sprouts needs from 12 to 14 hours, for example, is retained by the bottom of the growing chamber, even if the sprouter is tilted in order to speed drainage through the apertures 30. Hence, twice daily rinsing has been found satisfactory to care for most sprouts. Further, the side walls, such as walls, 12, 14, 16, 18, and 72 are preferably constructed from wood, specifically, redwood, so as to cooperate with the base 20, 74 in order to provide proper air circulation and ventilation to promote growth and discourage putrefaction. The drain holes or apertures 30 are of a size that are not clogged by seed hulls or roots of commonly grown sprouts, thus assuring quick, easy cleaning by the user.

As can be readily understood from the above description and from the drawings, better sprouts can be grown more easily in a sprouter according to the invention due to the even water retaining feature of the bottom surface of the growing chamber of the sprouter. This feature enables the sprouts to draw on a constant supply of water with only, for example, twice daily rinsing. The quick draining feature eliminates the drip and draining problems of other sprouters, and is in addition very easy to clean.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A sprouter, comprising, in combination:
   (a) wall means for defining the lateral extent of a growing chamber of the sprouter; and
   (b) a base connected to the wall means for forming a bottom of the growing chamber, the base including means for retaining a quantity of water and supplying sprouts in the growing chamber for a predetermined length of time, the base having a periphery, and the wall means including at least one wall forming a continuous surface around the periphery of the base, the wall means including a plurality of substantially planar walls pivotally connected together, each of the walls having edges defining a finite thickness and two spaced ends perpendicular to the edges, the ends of each of the walls being notched in alternate sequence to one another for interengaging with an end of an adjacent one of the walls, at least some of the walls being provided with holes extending perpendicularly to the edges and disposed at the notched ends of the walls, each of the holes being offset from a center of the finite thickness of the associated one of the walls, and pins inserted in the holes for pivotally joining the associated walls to one another, the offset of the holes locating the pins eccentrically with respect to the resulting joint for spacing the ends of the walls from one another when an included angle between the adjoining walls is increased and facilitating cleaning of the ends of the walls without removing the pins from the associated holes.

2. A structure as defined in claim 1, wherein the wall means further includes a latch releasably joining together the ends of one pair of the adjoining walls.

3. A structure as defined in claim 1, wherein an edge of the wall spaced from the base is provided with a ledge, and further including a cover panel removably supported by the ledge.

4. A sprouter comprising, in combination:
   (a) wall means for defining the lateral extent of a growing chamber of the sprouter; and
   (b) a base connected to the wall means for forming a bottom of the growing chamber, the base including means for retaining a quantity of water and supplying sprouts in the growing chamber for a predetermined length of time, the means for retaining including a plurality of proturbances extending codirectionally from a common surface of the base and forming indentations on the surface of the base for retaining water for nourishing seeds in the growing chamber and for preventing the seeds from sliding relative to the base when the base is tilted slightly, the base being a substantially planar sheet having a pair of parallel faces, one of the faces forming the common surface, and at least one aperture provided in the sheet for draining excess water from the growing chamber, the aperture being of a size that resists clogging by seed hulls and plant roots normally found in the growing chamber, the base having a periphery, and the wall means includes at least one wall forming a continuous surface around the periphery of the base, the wall means including a plurality of substantially planar walls pivotally connected together each of the walls having edges defining a finite thickness and two spaced ends perpendicular to the edges, the ends of each of the walls being notched in alternate sequence to one another for interengaging with an end of an adjacent one of the walls, at least some of the walls being provided with holes extending perpendicularly to the edges and disposed at the notched ends of the walls, each of the holes being offset from a center of the finite thickness of the associated one of the walls, and pins inserted in the holes for pivotally joining the associated walls to one another, the offset of the holes locating the pins eccentrically with respect to the resulting joint for spacing the ends of the walls from one another when an included angle between the adjoining walls is increased and facilitating cleaning of the ends of the walls without removing the pins from the associated holes.

5. A structure as defined in claim 4, wherein the wall means further includes a latch releasably joining together the ends of one pair of the adjoining walls.

6. A structure as defined in claim 4, wherein an edge of the wall spaced from the base is provided with a ledge, and further including a cover panel removably supported by the ledge.

* * * * *